June 27, 1933. H. I. WATERMAN 1,915,394
PROCESS FOR THE MANUFACTURE OF LIQUID PRODUCTS FROM COAL OR
CARBONACEOUS MATERIALS AND FOR LIQUEFYING SAID MATERIALS
Filed April 22, 1929
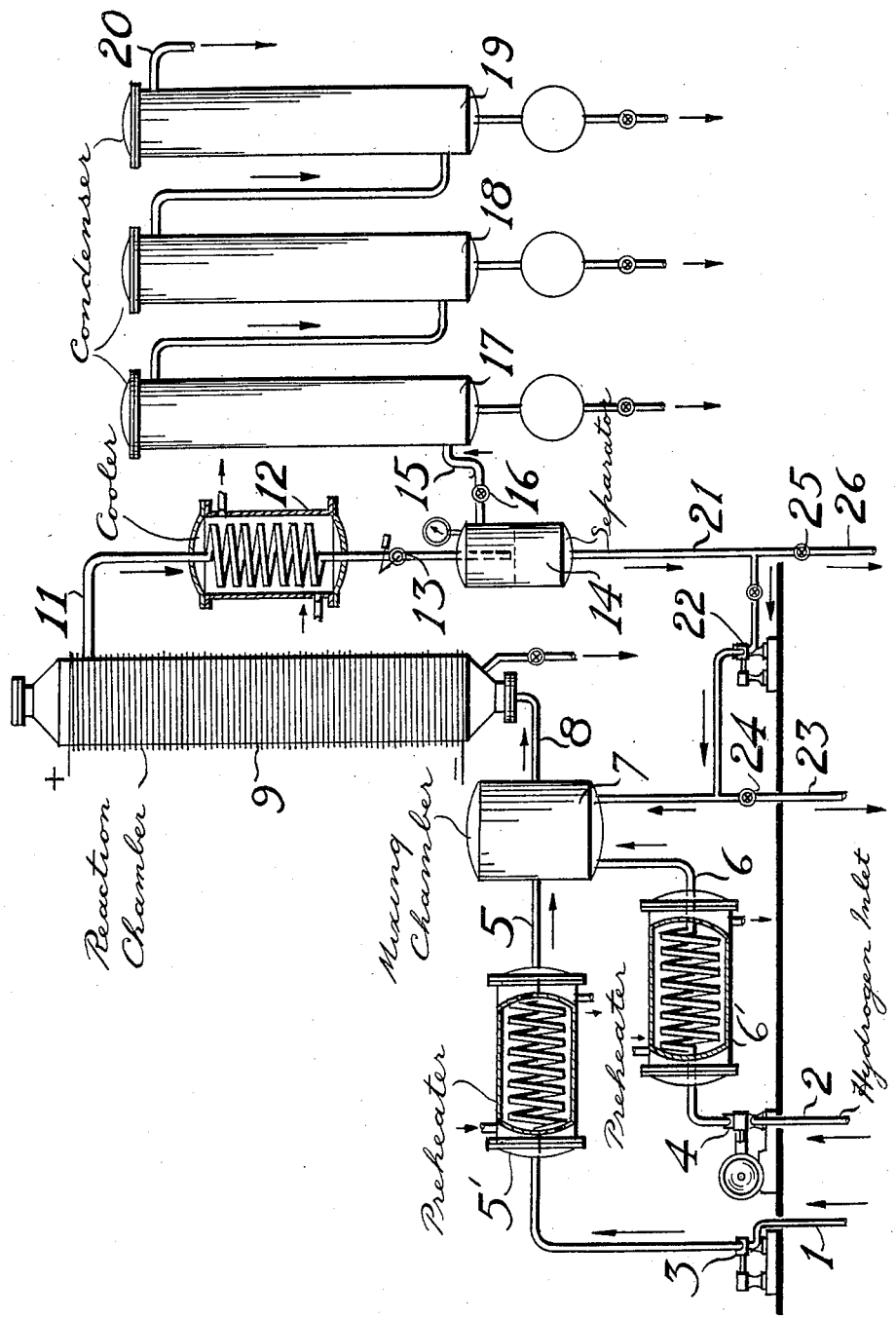
Hein Israel Waterman Inventor
P. L. Young, Attorney Patented June 27, 1933

1,915,394

UNITED STATES PATENT OFFICE

HEIN ISRAEL WATERMAN, OF DELFT, NETHERLANDS, ASSIGNOR TO DE BATAAFSCHE PETROLEUM MAATSCHAPPIJ, OF THE HAGUE, NETHERLANDS

PROCESS FOR THE MANUFACTURE OF LIQUID PRODUCTS FROM COAL OR CARBONACEOUS MATERIALS AND FOR LIQUEFYING SAID MATERIALS

Application filed April 22, 1929, Serial No. 357,333, and in the Netherlands May 16, 1928.

The present invention relates to a process for the manufacture of liquid products from coal or carbonaceous materials and for liquefying said materials, whereby the initial materials are heated with hydrogen or hydrogen containing gases under pressure, preferably in the presence of one or more catalysts.

In my co-pending application, filed March 13, 1929, No. 346,818, the aforesaid reaction is described as carried out in at least two stages, thereby regulating the pressure, temperature, and hydrogen-concentration in the first step in such a manner that only a few gaseous or low-boiling reaction products are formed, while in the second or further steps the reaction conditions are altered in such a way that the desired reaction products, benzine and kerosene among others, are formed. It appeared that in withdrawing the gaseous products formed after the first step, or after each step, while still at an elevated temperature, the yield of the desired reaction products was favourably affected.

Now, after further experiments, it was ascertained that the total yield of petroleum-like products can be considerably increased by treating the initial materials under a pressure of at least 50 atmospheres in the presence of hydrogen and, if desired, in the presence of a catalyst also, at continuously and rapidly increasing temperature and, directly after the desired optimum reaction temperature is reached, discontinuing heating and withdrawing, while the reaction mass still has a high temperature, by release of pressure, that part of the products which, at said temperature, is in a gaseous state.

It will be understood that according to the present process the mass is not maintained for some time at a certain temperature, but that heating is stopped directly after said temperature is reached. Thereafter the products which are in a gaseous state are withdrawn.

The above-described method of working offers the great advantage that the reaction mass is at a high temperature during a very short time only, in consequence whereof a too-intensive cracking action giving rise to the formation of gaseous hydrocarbons, such as methane, or deposition of coke, is avoided as much as possible. Moreover, the withdrawal of the gaseous part of the reaction products by release of pressure, while the reaction mass still has a high temperature, effects a complete separation of residual products and any lower-boiling products. The residue obtained in this way is immediately fit for a further conversion into lower-boiling products by the action of heat, pressure and hydrogen; thus preventing such lower-boiling products from being again exposed to high temperature, whereby they might undergo an undesired further splitting into rather valueless hydrocarbons of gaseous character. Furthermore, it has been found that the presence of benzine- and kerosene-like products in the reaction mass tends to cause flocculation and, in consequence, formation of coke under the conditions of temperature and pressure which are maintained when destructively hydrogenating.

It will be clear that this drawback also is overcome when working according to the present process, another advantage of which is that any water present in the materials to be treated, or which may be formed during the reaction, is removed completely from the residual product, thus avoiding the formation of undesirable emulsions with said residual products.

It will be understood that the present process is not restricted to the use of any particular kind of catalyst. Any kind of catalyst, well known in itself, may be used, which is suitable for the purpose; for instance, various molybdenum compounds which often appear to be effective catalysts. The method described may be applied to all kinds of carbonaceous materials which are known to be more or less fit for conversion into valuable liquid or lower-boiling products by the action of elevated temperature, pressure and hydrogen, for example coal, lignite, asphalt, hydrocarbon oils, tars of different natures, and the like. If coal is to be treated continuously it may be mixed in well-known way with oil or tar before conducting it through the apparatus.

*Example*

200 grams of brown coal containing approximately 7% mineral constituents are rapidly heated in a closed vessel in the presence of a molybdenum-containing catalyst together with hydrogen under pressure. In 40 minutes the temperature of the mass is raised from room temperature to about 460° C. Directly after said temperature has been reached, heating is stopped and when the temperature is approximately 325° C., the gaseous part of the converted products is drawn off by release of pressure and condensed. In this manner 15.6% (by weight) of the original dry and ash-free brown coal, benzine and kerosene-like products is obtained. Furthermore, 4.6% phenols, 12.5% water and 23.2% of non-condensed gases are formed, the latter consisting, for a great part, of $CO_2$. In the reaction vessel 41.0% of a high-boiling asphaltic residue remains, which is again treated with hydrogen under pressure in the presence of a molybdenum-containing catalyst. The mass is heated for 40 minutes to about 470° C. and then maintained during about 15 minutes at 480° C. Thereafer, heating is stopped and the gaseous part of the products drawn off by release of pressure, while the mass has still a relatively high temperature. A further quantity of 12.0% by weight of the original dry and ash-free brown coal of benzine and kerosene-like products and 1.4% phenols is found in the products drawn off.

In the accompanying drawing, a diagrammatic view of an apparatus or plant for carrying out the invention is illustrated.

The material to be treated enters the system through tube 1 and is pumped into a mixing chamber 7 through conduit 5 by means of pump 3, the mixing chamber being so constructed as to withstand high pressure. Through conduit 2, pump 4 and conduit 6, hydrogen is pumped under pressure into chamber 7. Conduits 1 and 2, or conduits 5 and 6, or both, may be provided with suitable preheaters, and chamber 7 may also be heated in any suitable way.

The mixture is then introduced through conduit 8 into the reaction chamber 9, which is heated; and in said reaction chamber the velocity of the streaming mass or the heating of the chamber, or both the velocity and the heating, is regulated in such a way that the temperature of the mass increases continuously and as quickly as possible to the desired reaction temperature. When the mass has reached the said maximum temperature, it leaves the reaction chamber through conduit 11 and enters the separation chamber 14. Partial cooling of the mass, before entering chamber 14, may be effected by cooler 12, and thereafter the pressure is released by pressure release valve 13, in consequence of which the mass now entering separation chamber 14 is separated into a residue and lower-boiling products. The latter products escape in gaseous form through a conduit 15 provided with a valve 16 into a condensation apparatus indicated by numerals 17, 18 and 19. The various fractions of liquid products formed are discharged from the condensation apparatus, and the uncondensed part of the gases is discharged through conduit 20.

The residue leaves chamber 14 through conduit 21, and may be discharged from the system through conduit 26 provided with valve 25, or may recycle by means of conduit 21 and pump 22. If desired, the residue may also be treated in another apparatus, to which it is conducted by means of tube 23 provided with valve 24.

What I claim is:

1. A process for liquefaction of solid carbonaceous materials in the presence of high pressure hydrogen, which comprises rapidly heating the initial carbonaceous material with hydrogen under pressure, from a temperature below that at which reaction sets in to a suitable reaction temperature within the lower part of the range commonly used for destructive hydrogenation, immediately discontinuing heating, and rapidly reducing temperature whereby only a relatively small quantity of vaporized low boiling products are formed, separating the vaporized low boiling products from the residue while still at an elevated temperature, and recovering heavy fluid products substantially free from low boiling constituents.

2. A process for the liquefaction of solid carbonaceous materials, which comprises rapidly heating said solid material with hydrogen under pressure from a temperature below that at which reaction sets in, to a reaction temperature within the lower part of the range commonly used for destructive hydrogenation, such temperature being attained within a time not substantially longer than 40 minutes, immediately discontinuing the heating, withdrawing the gaseous products and reducing temperature of the remaining residual reactants to a degree sufficient to avoid substantial decomposition in the absence of hydrogen.

3. Process according to claim 1 in which the said reaction temperature is about 450° C.

4. Process according to claim 2 in which the said reaction temperature is about 450° C.

5. A process for liquefaction of soft coal which comprises rapidly heating the coal with hydrogen under pressure from a temperature below that at which reaction sets in to a reaction temperature of about 450° C., said reaction temperature being attained within a time not substantially longer than 40 minutes, immediately discontinuing heating, withdrawing the gaseous products and reducing temperature of the remaining residual reactants to a degree sufficient to avoid substantial decomposition in the absence of hydrogen.

In testimony whereof I have affixed my signature.

HEIN ISRAEL WATERMAN.